United States Patent

[11] 3,618,589

| [72] | Inventor | Lorenzo Tavani<br>Milan, Italy |
|---|---|---|
| [21] | Appl. No. | 20,143 |
| [22] | Filed | Mar. 16, 1970 |
| [45] | Patented | Nov. 9, 1971 |
| [73] | Assignee | Sybron Corporation<br>Rochester, N.Y. |

[54] DESALINATION PROCESS BY ION EXCHANGE
16 Claims, 2 Drawing Figs.

[52] U.S. Cl. ................................................ 127/46 A,
210/30, 210/38, 210/37
[51] Int. Cl. .............................................. B01d 15/04
[50] Field of Search .......................................... 210/30, 32,
37, 38, 282, 283, 284; 127/46 A

[56] References Cited
UNITED STATES PATENTS
| 2,606,847 | 8/1952 | Newkirk et al. ............. | 127/46 A |
|---|---|---|---|
| 2,841,550 | 7/1958 | Beohner ....................... | 210/38 X |
| 3,156,644 | 11/1964 | Kunin .......................... | 127/46 A |

Primary Examiner—Samih N. Zaharna
Attorney—Theodore B. Roessel

ABSTRACT: A method for demineralizing fluids comprising contacting the fluid to be treated with a first bed of strong base anion resin in the bicarbonate form, contacting said fluid with a weak acid and strong acid cation resin and finally contacting the fluid with a weak base anion resin. The anion resins are regenerated by passing aqueous bicarbonate solution through the strong base resin, the effluent therefrom is passed through the weak base resin. The cation resins are regenerated by passing a mineral acid solution through the strong acid resin and the effluent therefrom is passed through the weak acid resin.

PATENTED NOV 9 1971　　　　　　　　　　　　　　　3,618,589

INVENTOR.
LORENZO TAVANI
BY
ATTORNEY

DESALINATION PROCESS BY ION EXCHANGE

FIELD OF INVENTION

The following process concerns itself with the use of ion exchange resin in the desalting of "high-salt" solutions.

BACKGROUND OF THE INVENTION

The invention refers to a new method for removing salt from water solutions through the use of ion exchange resins. It permits one to obtain demineralized water at low cost and overcomes and heretofore recognized difficulties (cost) experienced when traditional ion exchange processes are used to process water having a high concentration of salt. Factors which affect the cost of treating concentrated saline solutions are the following:
1. High volume of ion exchange resins necessary.
2. High consumption of reagents (regenerants) required.
3. Substantial amount of wash water required for rinsing resins following regeneration. In connection with item three, if treated water must be used to wash the resin, the process becomes unrealistic since practically the entire production of treated water would be required. On the other hand, if unprocessed water is employed, the resins could be exhausted in the process of removing the regenerants.

However, among all the factors involving the traditional processes, perhaps the most important determinant is the maximum utilization of the total exchange capacity of the resins. The useful capacity determines the volume of resin to be employed and consequently has direct bearing on the equipment investment costs.

In the so-called traditional demineralization processes and when the salt content of the treated water does not exceed 500 milligrams per liter, one is inclined to use that part of the total exchange capacity of the resin which requires the lowest consumption of regenerants. This capacity usually corresponds to about 50 percent of the total exchange capacity of the resin. When the traditional processes are used to treat waters having a higher concentration of salt, a marked increase in the salt content of the effluent water occurs. In order to limit the salt leakage, it becomes necessary to increase the quantity of regenerants with an accompanying increase in already high costs; and in actual practice a progressive degradation of efficiency takes place as the salt content of the raw water increases.

At this time, known techniques will not permit one to employ economically the ion exchange process for the treatment water having a salt content greater than 1,000 mg. per liter of solution. Beyond this limit the operating costs become higher than those resulting from the use of other techniques such as multistage distillation. It has been proven that the process described in this patent will permit the economical desalination of water having a salt concentration of 2,500 mg. per liter or higher by maintaining the investment and operating costs at acceptable levels. This is accomplished by making use of the maximum capacities of the exchange resins employed, consuming almost the theoretical amounts of required regenerants, while producing a treated water having low residual salinity. The same process permits one to treat water having less than 500 mg. per liter of salt at lower operating costs than those experienced with the traditional demineralization techniques.

Ion exchange treatment plants employ resin in cylindrical units in which the resins remain in static condition, with the volume of resin being equal roughly to one-half the volume of the container. In the usual demineralization plant, there are at least two units in series, a cation unit followed by an anion unit. Mineral acids—hydrochloric or sulfuric—are used to regenerate the cation resin. Caustic soda, or more rarely, ammonium hydroxide is employed in the regeneration of the anion resin. (In the latter case the anion must be of the weakly basic type.) The cation and anion resins used may be of two types each—strong or weak acid, strong or weakly basic, respectively. The weak acid cation can absorb the free base (alkalinity) cations when in the carbonate or bicarbonate form. The weakly basic anion can absorb only the free acid anions. The splitting of a neutral salt always requires the use of a strong acid resin or a strong base resin. In the traditional process, the weak acid cation resins are used alone or placed before the strong cationic resin. This resin reacts with 113 bicarbonates and the strong acid resin with the neutral salts. In so doing, mineral acid and carbonic acid are formed. The mineral acid is absorbed subsequently by a weakly basic resin and the carbonic acid by the strong base resin. These resins will also remove silicic acid if it is present. Thus, the traditional plant layout involves four ion exchange units operating in series and employing a weak cationic, strong cationic, weak anionic and strong anionic in this order. It is also recognized that two units in series—strong cation and strong anions—will provide the same results but require a greater quantity of regenerants—300 percent of theoretical as compared with 200 percent for the four-unit scheme. In order to fully describe the present techniques, one must say that it is possible to eliminate the use of the strong base resin if degasification is employed after the water is passed through the cation units. The degasification is accomplished by bubbling air, under vacuum, through the water being treated.

From what we have stated, the cation resins are always used prior to the anion resins. Furthermore, the "salt-splitting" capability of the strong base anion resin is never used since serious technological difficulties could be created. The cations liberated by the "splitting" in the anionic exchanger results in hydrates which are often only slightly or completely insoluble as in the case of magnesium hydroxide. These insoluble products would block the unit completely in a period of time.

SUMMARY OF INVENTION

Figure 1:
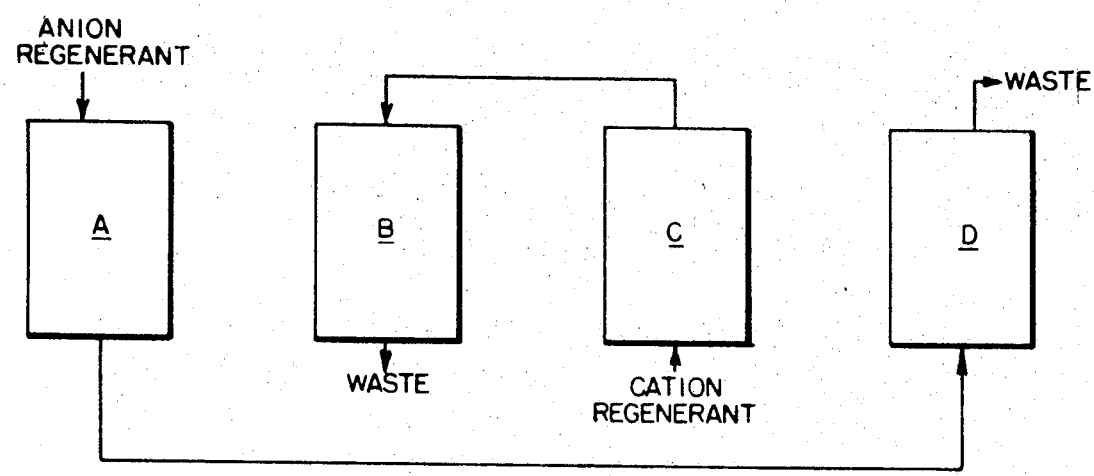
FIG. 1 is a schematic flow diagram illustrating a preferred method of regeneration according to this invention.

By the method of this invention fluids having high mineral content can be demineralized economically by contacting the fluid first with strong base anion exchange resin in the bicarbonate form followed by contact with a weak acid cation exchange resin. The fluid is then subjected to a polishing operation consisting of contacting the fluid with strong acid cation exchange resin followed by contacting said fluid with a weak base anion exchange resin. Regeneration is carried out by passing a bicarbonate solution first through the strong base anion exchange resin and then through the weak base anion exchange resin. The cation resins are regenerated by first passing acid regenerant through the strong acid cation exchange resin and then through the weak acid cation exchange resin.

DESCRIPTION OF INVENTION

In this invention, it is preferred to use four units in series containing a strong base resin, weakly acid resin, strong acid resin and weakly basic in this order. The layout is illustrated in the attached drawing designated FIG. 1. This procedure, never realized until now, makes possible the use of resins at their highest exchange capacities with nearly theoretical consumption of regenerants. Sodium or ammonium bicarbonate is used to regenerate the anion resin while hydrochloric or sulfuric acid are employed for the cation resins. In the preferred method of regeneration, the anion regenerant passes through the unit containing strong base resin after which it is passed through the unit containing weak base resin. The mineral acid regenerant is passed through the unit containing strong acid cation resin and then through the weak acid unit. Water necessary for rinsing after regeneration follows the same pattern of flow as the regenerants. During the operation cycle, when raw water is being treated, the pattern of flow is traditional in that it passes through each unit in series.

It is characteristic of this invention that after contact with the strong base resin the effluent fluid contains all the cations of the raw water transformed to the bicarbonate form with the mineral acid having been absorbed by the strong base resin. The whole cation content of the fluid is then absorbed by contact with weak acid cation exchange resin with the formation of carbonic acid. The thus treated fluid is then passed in contact with strong acid cation exchange resin and a weak base anion exchange resin to remove the leakage from the strong base and weak acid resins.

If ammonium bicarbonate is used to regenerate the anion resins, ammonia can be recovered from the exhausted regenerating solution by treating it with milk of lime. The involved ammonia gas is absorbed in water. The obtained aqueous ammonia solution is then saturated with gaseous carbon dioxide in order to obtain ammonium bicarbonate. The recovered amount of ammonium bicarbonate is equal to 80 percent of the quantity required by the regeneration of the anion resins.

The treated effluent contains only carbonic acid which can be removed by the traditional degasification procedure. If one so wishes, the liberated carbonic acid can be reused by reacting it with a solution of soda ash or caustic soda to form sodium bicarbonate which in turn can be used for regeneration of the anion resins.

It is within the scope of this invention to combine the strong acid and weak acid cation exchange resins in a single unit. In such a case, the strong acid and weak acid resins may be maintained as separate layers in a single unit or as a mixed bed.

Another characteristic of this invention is that the strong acid absorbed by the strong base anion resin is displaced therefrom during regeneration without changing the pH—that is to say, without the use of caustic soda traditionally employed in ion exchange processes. Since no change of pH occurs in the service phase, the cost of materials used in fabrication of the first unit is markedly reduced.

The strong base anion resin can be of either the type 1 or type 2 resin. Those resins having either active quaternary alkyl ammonium or quaternary alkanol ammonium group will perform satisfactorily.

The patent is fully illustrated in the following examples which do not constitute any limitation of this process.

EXAMPLE 1

Figure 2:
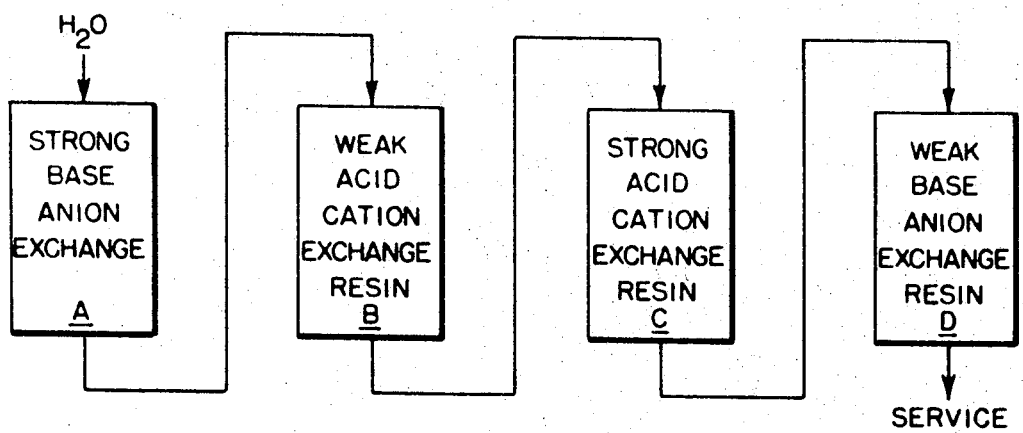
FIG. 2 is a schematic flow diagram illustrating a preferred method for demineralization of fluids according to the present invention.

Referring to FIGS. 1 and 2, four units in series are employed for this process with operating conditions as outlined. Unit A contains 60 liters of a strong base resin identified as "Relite 2 AS." Unit B contains 50 liters of weakly acid resin of the carboxylic type identified as "Relite CN." Unit C holds 50 liters of strong acid resin—sulfonic type—identified as "Relite CFS." Unit D contains 50 liters of weakly basic resin identified as "Relite mg. 1." Thus, 110 liters of anionic resin are employed in conjunction with 100 liters of cationic resin. All resins are in "bead" form (spherical in nature) with diameters ranging between 0.3 and 1.0 mm. The height of the resin beds in the individual units is 800 mm. with the head space being equal to the volume of resin. In order to place or return the resin beds to the most satisfactory operation conditions, one introduces water into the bottom of each unit for a period of about 10 minutes at a rate which is sufficient to suspend the resin without removing it from the unit.

Regeneration of anion resins takes place as outlined in FIG. 1 by passing a solution of sodium bicarbonate through unit A with the effluent being passed through unit D, after passing through unit A downflow. Rinsing takes place according to the same pattern. To regenerate the cation resin, 100 liters of six (6) percent hydrochloric acid are used with the effluent from unit C being passed through unit B. Two hundred (200) liters of water are required for rinsing the two cation units. Following rinsing, a short backwash is given to unit A only. The regeneration step requires 100 minutes for the anion units, 90 minutes for the cation units and can be made simultaneously.

Following regeneration, rinsing, and backwashing, the units are placed in operation and raw water is introduced as illustrated in FIG. 2 at a rate of 600 liters per hour—or 12 liters per hour per liter of resin for each unit. The operating data for the whole process covering a wide range of salt concentrations, the values of the exchange capacities of the resins and the consumption of regenerants are stated in one unit of measure represented by the quantity of chemicals equal to calcium carbonate and are set forth in the following Tables A–C.

TABLE A

Ionic content in the water to be desalted, mg./l. as $CaCO_3$

| Ca | 1,100 | $HCO_3$ | 200 |
|---|---|---|---|
| Mg | 100 | Cl | 500 |
| Na | 500 | $SO_4$ | 1,000 |
|   | 1,700 |   | 1,700 |

Produced purified water = 4,400 liters
Characteristics of purified water, degassed:
  Conductibility, microohms = 15
  Chlorides = 0
  Carbonatic alkalinity = 3 mg./l. $CaCO_3$
Absorbed salinity/cycle = 7,480 g. as $CaCO_3$
Exchange capacity/l. resins:
  74, 8 g. $CaCO_3$/1. of cationic resin
  68, 0 g. $CaCO_3$/1. of anionic resin
Quantity of reagents used/1. resin:
  60, 0 g. HCl/l. cat. res. = 82, 2, g. as $CaCO_3$
  125, 5 g. $NaHCO_3$/1. an. res. = 74, 6 as $CaCO_3$
Ratio, regenerative level/capacity of exchange:
  Cationic resin—82, 2:74, 8=1,100
  Anionic resin—74, 6:68, 0=1,098

TABLE B

Ionic content in the water which is to be desalted, mg./l. as $CaCO_3$

| Ca | 100 | $HCO_3$ | 200 |
|---|---|---|---|
| Mg | 100 | Cl | 2,200 |
| Na | 2,500 | $SO_4$ | 300 |
|   | 2,700 |   | 2,700 |

Produced purified water = 2,760 liters
Characteristics of the purified, degassed water:
  Conductibility, microohms = 25
  Chlorides = 3 mg./l. as $CaCO_3$
  Carbonatic alkalinity = 15 mg./1. $CaCO_3$
Absorbed salinity/cycle = 7,450 g. as $CaCO_3$
Capacity of exchange/1. resins:
  74, 5 g. $CaCO_3$/1. cationic resin
  67, 7 g. $CaCO_3$/1. anionic resin
Quantity of used regenerant/1. resin:
  60, 0 g. HC1/1. cationic resin = 82, 2 g. as $CaCO_3$
  125, 5 g. $NaHCO_3$/1. anionic resin = 74, 6 g. as $CaCO_3$
Ratio, regenerative level/capacity of exchange:
  Cationic resin—82, 2:74, 5=1,103
  Anionic resin—74, 6:67, 7=1,102

TABLE C

Ionic content in the water to be desalted, mg./l. as $CaCO_3$

| Ca | 600 | $HCO_3$ | 200 |
|---|---|---|---|
| Mg | 100 | Cl | 2,500 |
| Na | 2,500 | $SO_4$ | 500 |
|   | 3,200 |   | 3,200 |

Produced purified water = 2,300 liters
Characteristics of the purified, degassed water:
  Conductibility, microohms = 35
  Chlorides = 5 mg./l. as $CaCO_3$ Carbonatic alkalinity = 15/mg. $CaCO_3$
Absorbed salinity/cycle = 7,360 as $CaCO_3$
Capacity of exchange/l. resins:
  73, 6 g. $CaCO_3$/l. cationic resins
  66, 9 g. $CaCO_3$/l. anionic resins
Quantity of regenerant used/l. resins:
  66, 0 g. HCl/l. cationic resin = 82, 2 g. as $CaCO_3$
  125, 5 g. $NaHCO_3$/l. anionic resin = 74, 6 g. as $CaCO_3$
Ratio, regenerative level/exchange capacity:
  Cationic resin—82, 272, 6=1,117
  Anionic resin—74, 6:66, 9=1,116

EXAMPLE

In order to make the comparison between this invention and the traditional method of desalination complete, the following illustrates a conventional process for desalinating water ion exchange resin. In this case, four units in series are used. Fifty (50) liters of strong acid cationic resin are used in the first two units. Sixty (60) liters of weakly basic anion resin are used in unit 3 and fifty (50) liters of strong base anion in unit 4. Thus, the total cation resin used amounts to 100 liters versus a total of 110 liters of anion resin employed. All resins are "bead type" with particle size ranging from 0.3 to 1.0 mm. in diameter. The height of the resin bed in each unit is 800 mm. and the headspace in each unit is equal to the volume of resin. Resins are backwashed separately in each unit.

The regeneration of the two cation units is made using a six (6%) percent solution of hydrochloric acid and passing the solution downflow through the number two unit. The effluent is then passed downflow through number one unit. Regeneration of the anion resin is accomplished by passing a four (4%) percent solution of sodium hydroxide downflow through unit 4, with the effluent passing downflow through unit 3. In the case of the anion units, the weak base anion is contained in unit 3, with the strong base resin in unit 4. The quantity of hydrochloric acid used is 15 kg. (100%). 15 kg. of sodium hydroxide (100%) are used for anion regeneration. The rinsing, following regeneration, follows the same path as the regenerants. The cation resin requires 500 liters of rinse water while the anion resins take 1,200 liters. The following is a summary of the results obtained and the operating conditions.

TABLE D

Ionic content of water which is to be desalted, mg./l. as $CaCO_3$

| Ca | 1,100 | $HCO_3$ | 200 |
|---|---|---|---|
| Mg | 100 | Cl | 500 |
| Na | 500 | $SO_4$ | 1,000 |
|  | 1,700 |  | 1,700 |

Produced purified water = 3,530 liters
Characteristics of the purified water:
  Conductibility, microohms = 50
  Hardness = 5 mg./l. $CaCO_3$
  Free alkalinity = 20 mg./l. $CaCO_3$
Salinity Absorbed/cycle = 6,000 g. as $CaCO_3$
Capacity of exchange/l. resin:
  50, 0 g. $CaCO_3$/l. cationic resins
  54, 6 g. $CaCO_3$/l. anionic resins
Quantity of used regenerant/l. resin:
  125 g. HCl/liter cationic resin = 171, 3 g. as $CaCO_3$
  127 g. NaOH/liter anionic resin = 159, 0 as $CaCO_3$
Ratio, regenerative level/exchange capacity:
  Cationic resin 171, 3:50, 0=3,325
  Anionic resin 159, 0:54, 6=2,920

I claim:

1. A process for the removal of ionizable matter from fluids which comprises passing fluid to be treated in contact with a strong base anion exchange resin in the bicarbonate form thereby to exchange anions in said fluid and to form cation bicarbonates, passing said fluid in contact with a weak acid cation exchange resin to remove cations from said fluid and polishing said fluid by passing it in contact with a strong acid cation exchange resin and a weak base anion exchange resin.

2. The process of claim 1 wherein said fluid is passed through a first bed consisting essentially of said strong base anion exchange resin, a second bed consisting essentially of a mixture of said weak acid and said strong acid cation exchange resin and through a third bed consisting essentially of said weak base anion exchange resin.

3. The process of claim 1 wherein said fluid is passed through a first bed consisting essentially of said strong base anion exchange resin, a second bed consisting essentially of said weak acid cation exchange resin, a third bed consisting essentially of said strong acid cation exchange resin and a fourth bed consisting essentially of said weak base anion exchange resin.

4. The process of claim 1 wherein said weak acid cation exchange resin is in the hydrogen form.

5. The process of claim 1 wherein said strong acid cation exchange resin is in the hydrogen form and said weak base anion exchange resin is in the bicarbonate form.

6. The process of claim 1 wherein said fluid is water.

7. The process of claim 1 wherein after treatment to remove ions, said fluid is degasified thereby to remove carbon dioxide therefrom.

8. The process of claim 1 wherein said strong base and weak base anion exchange resins are regenerated upon substantial exhaustion of at least one of said resins, said regeneration comprising first passing a regenerant bicarbonate solution in contact with said strong base anion exchange resin and then passing said regenerant bicarbonate solution in contact with said weak base anion exchange resin whereby said anion exchange resins are converted to the bicarbonate form.

9. The process of claim 8 wherein said regenerant bicarbonate solution is a 6 percent aqueous solution of compound selected from the group consisting of sodium and ammonium bicarbonate.

10. The process of claim 8 wherein said anion exchange resins are water washed following contact with said regenerant solution.

11. The process of claim 1 wherein said strong acid and weak acid cation exchange resins are regenerated upon substantial exhaustion of at least one of said resins, said regeneration comprising first passing a regenerant acid solution in contact with said strong acid cation exchange resin and then passing said regenerant in contact with said weak acid cation exchange resin whereby said cation exchange resins are converted to the hydrogen form.

12. The process of claim 11 wherein said regenerant acid solution is an aqueous solution of a mineral acid.

13. The process of claim 11 wherein said regenerant is a 6 percent aqueous solution of hydrochloric acid.

14. The process of claim 11 wherein said regenerant is a 1 percent aqueous solution of sulfuric acid.

15. The process of claim 11 wherein said cation exchange resins are water washed following contact with said regenerant solution.

16. The process of claim 1 wherein said fluid is selected from the class consisting of sugar cane and sugar beet diffusion juice.

* * * * *